(12) United States Patent
Kim et al.

(10) Patent No.: US 12,382,275 B2
(45) Date of Patent: Aug. 5, 2025

(54) COMMUNICATION ASSOCIATED WITH EDGE COMPUTING

(71) Applicant: LG ELECTRONICS INC., Seoul (KR)

(72) Inventors: Laeyoung Kim, Seoul (KR); Hyunsook Kim, Seoul (KR); Myungjune Youn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 507 days.

(21) Appl. No.: 17/906,107

(22) PCT Filed: Mar. 18, 2021

(86) PCT No.: PCT/KR2021/003361
§ 371 (c)(1),
(2) Date: Sep. 12, 2022

(87) PCT Pub. No.: WO2021/187913
PCT Pub. Date: Sep. 23, 2021

(65) Prior Publication Data
US 2023/0094062 A1 Mar. 30, 2023

(30) Foreign Application Priority Data

Mar. 18, 2020 (KR) .................. 10-2020-0033176
Jun. 26, 2020 (KR) .................. 10-2020-0078571
Jul. 6, 2020 (KR) .................. 10-2020-0083060

(51) Int. Cl.
*H04W 8/12* (2009.01)
*H04W 64/00* (2009.01)
*H04W 84/02* (2009.01)
*H04L 41/0894* (2022.01)

(52) U.S. Cl.
CPC ............ *H04W 8/12* (2013.01); *H04W 64/003* (2013.01); *H04W 84/02* (2013.01); *H04L 41/0894* (2022.05)

(58) Field of Classification Search
None
See application file for complete search history.

(56) References Cited

U.S. PATENT DOCUMENTS

2018/0352050 A1* 12/2018 Li ................. H04L 67/5682
2020/0304983 A1* 9/2020 Zhu ................. H04W 8/082
(Continued)

FOREIGN PATENT DOCUMENTS

WO 2017-186260 11/2017
WO 2017-194080 11/2017
(Continued)

OTHER PUBLICATIONS

PCT International Application No. PCT/KR2021/003361, International Search Report dated Jun. 28, 2021, 4 page.
(Continued)

*Primary Examiner* — German Viana Di Prisco
(74) *Attorney, Agent, or Firm* — LEE, HONG, DEGERMAN, KANG & WAIMEY

(57) ABSTRACT

A disclosure of the present specification provides a method for performing, by a visited public land mobile network-policy control function (V-PCF), communication using edge computing. The method comprises the steps of: establishing UE policy association with a home public land mobile network-policy control function (H-PCF); receiving a first subscription message from the H-PCF; and transmitting a second subscription message to a visited public land mobile network-unified data repository (V-UDR). The first subscription message is a message that requests a notification, according to edge application server (EAS) information (Continued)

being updated or modified, the second subscription message is a message that requests a notification, according to the EAS information being updated or modified, the second subscription message is based on the first subscription message, and the EAS information may be information that is generated by an application function (AF) and transmitted to the V-UDR.

9 Claims, 10 Drawing Sheets

(56) References Cited

U.S. PATENT DOCUMENTS

2021/0112412 A1* 4/2021 Ke .................. H04W 48/02
2022/0191765 A1* 6/2022 Ding ................ H04W 40/24
2022/0264370 A1* 8/2022 Qiao ............ H04W 28/0967
2022/0386100 A1* 12/2022 Lee ................. H04W 28/02

FOREIGN PATENT DOCUMENTS

WO    2019-104280    5/2019
WO    2019-194633    10/2019

OTHER PUBLICATIONS

3rd Generation Partnership Project, "Technical Specification Group Services and System Aspects; Study on enhancement of support for Edge Computing in 5G Core network (5GC) (Release 17)," 3GPP TR 23.748 V0.3.0, Jan. 2020, 42 pages.

* cited by examiner

COMMUNICATION ASSOCIATED WITH EDGE COMPUTING

CROSS-REFERENCE TO RELATED APPLICATION(S)

This application is the National Stage filing under 35 U.S.C. 371 of International Application No. PCT/KR2021/003361, filed on Mar. 18, 2021, which claims the benefit of earlier filing date and right of priority to Korean Application Nos. 10-2020-0033176, filed on Mar. 18, 2020, 10-2020-0078571, filed on Jun. 26, 2020, and 10-2020-0083060, filed on Jul. 6, 2020, the contents of which are all hereby incorporated by reference herein in their entireties.

TECHNICAL FIELD

The present specification relates to mobile communications.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Meanwhile, edge computing, a type of distributed computing that introduces computation and data storage where needed to improve response time and save bandwidth, is being discussed. However, there was inefficiency in the process of performing edge computing when a UE roamed.

SUMMARY

When the UE roams, the inefficiency existing in the procedure between the roaming network (VPLMN) and the home network (HPLMN) is a problem.

In order to solve the above-mentioned problem, V-PCF (PCF of VPLMN) requests notification (subscription) according to the update of EAS information to V-UDR on behalf of H-PCF (PCF of HPLMN). And V-PCF sends updated EAS information to each HPLMN, then edge computing may be efficiently provided to the UE.

The present specification may have various effects.

For example, through the disclosures in the present specification, the V-PCF can efficiently perform edge computing by delivering updated EAS information to each the H-PCF of the UEs roaming to the PLMN to which the V-PCF belongs.

The claims described in the present specification may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim may be combined to be implemented as an apparatus, and the technical features of the method claim of the present specification and the technical features of the apparatus claim may be combined and implemented as a method. Other implementations are within the scope of the following claims.

DETAILED DESCRIPTION

Figure 1:
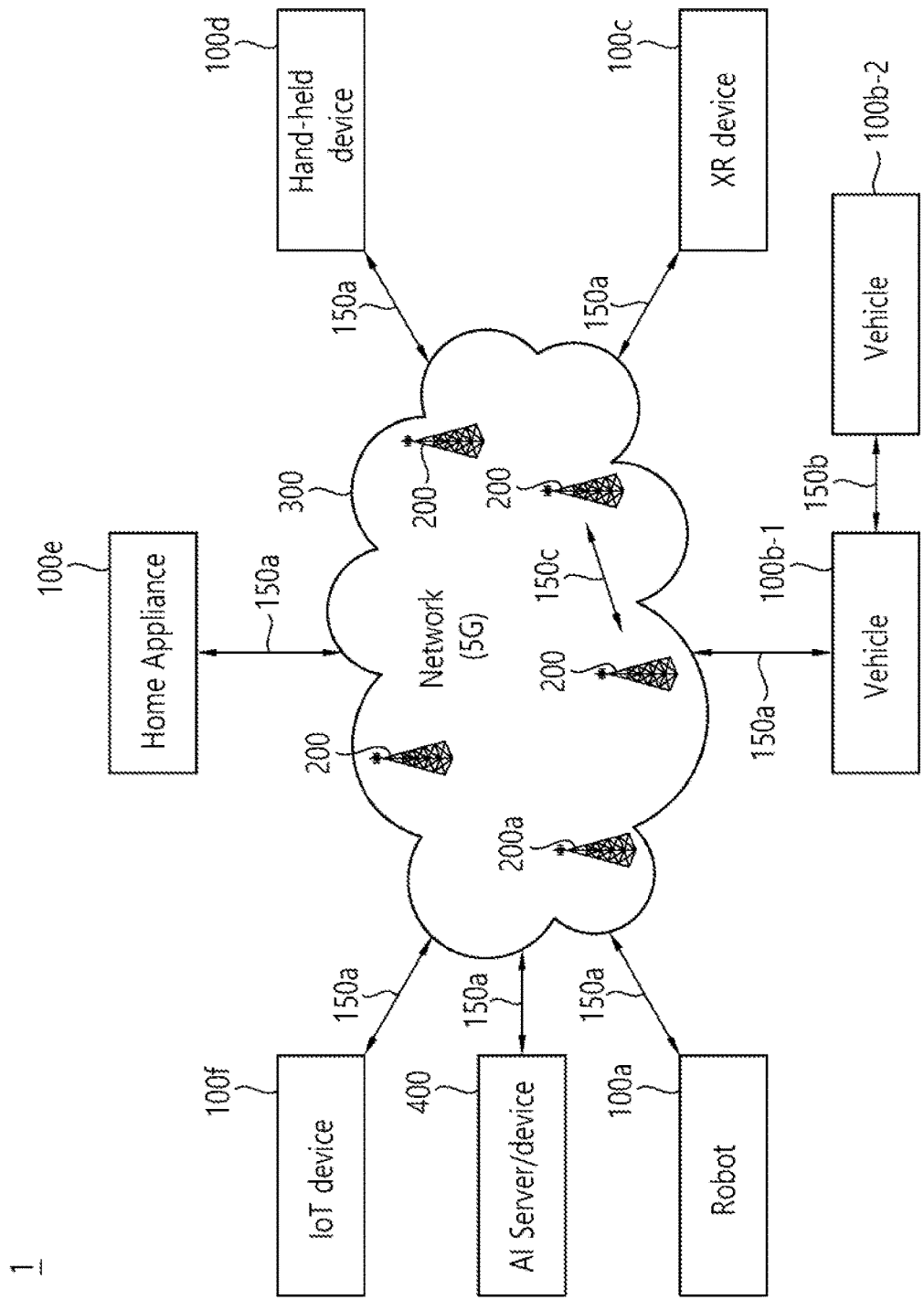
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

In the accompanying drawings, user equipment (UE) is illustrated by way of example, but the illustrated UE may be referred to as a terminal, mobile equipment (ME), and the like. In addition, the UE may be a portable device such as a notebook computer, a mobile phone, a PDA, a smart phone, a multimedia device, or the like, or may be a non-portable device such as a PC or a vehicle-mounted device.

Hereinafter, the UE is used as an example of a wireless communication device (or a wireless device, or a wireless device) capable of wireless communication. An operation performed by the UE may be performed by a wireless communication device. A wireless communication device may also be referred to as a wireless device, a wireless device, or the like. Hereinafter, AMF may mean an AMF node, SMF may mean an SMF node, and UPF may mean a UPF node.

A base station, a term used below, generally refers to a fixed station that communicates with a wireless device, and an evolved-NodeB (eNodeB), an evolved-NodeB (eNB), a BTS (Base Transceiver System), an access point (Access Point), may be called other terms such as gNB (Next generation NodeB).

I. Techniques and Procedures Applicable to the Disclosure of this Specification

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/ environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/ demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set.

The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
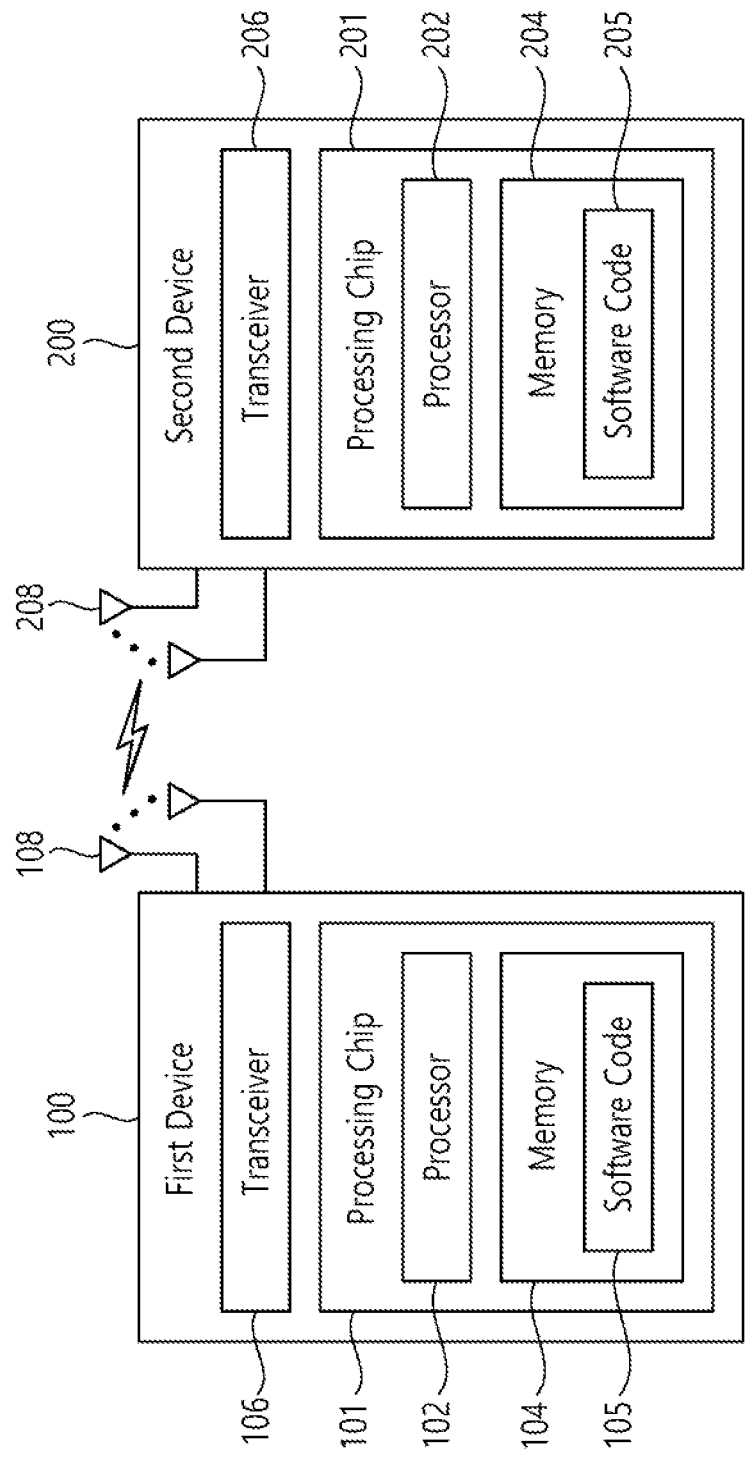
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
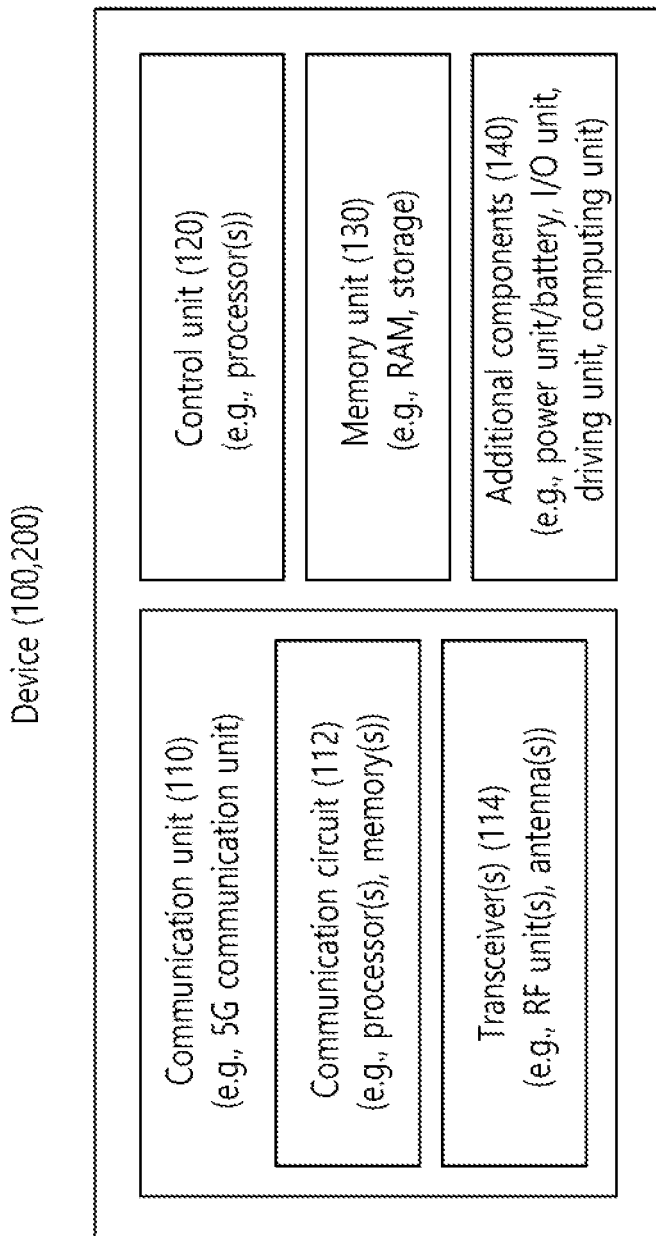
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

Figure 4:
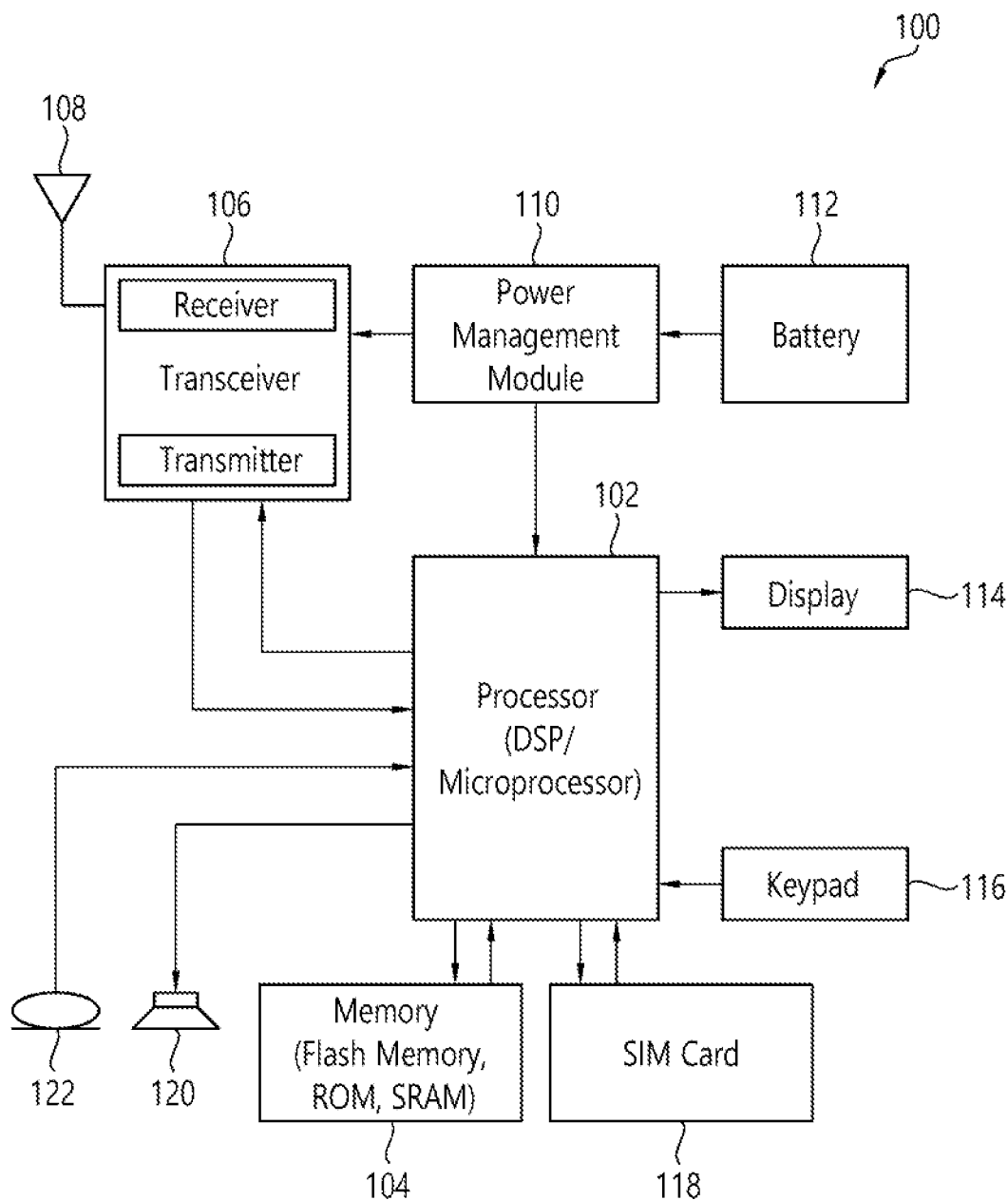
FIG. 4 shows an example of UE to which implementations of the present disclosure is applied.

FIG. 4 shows an example of UE to which implementations of the present disclosure is applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 110, a battery 112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, a series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 116 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 5:
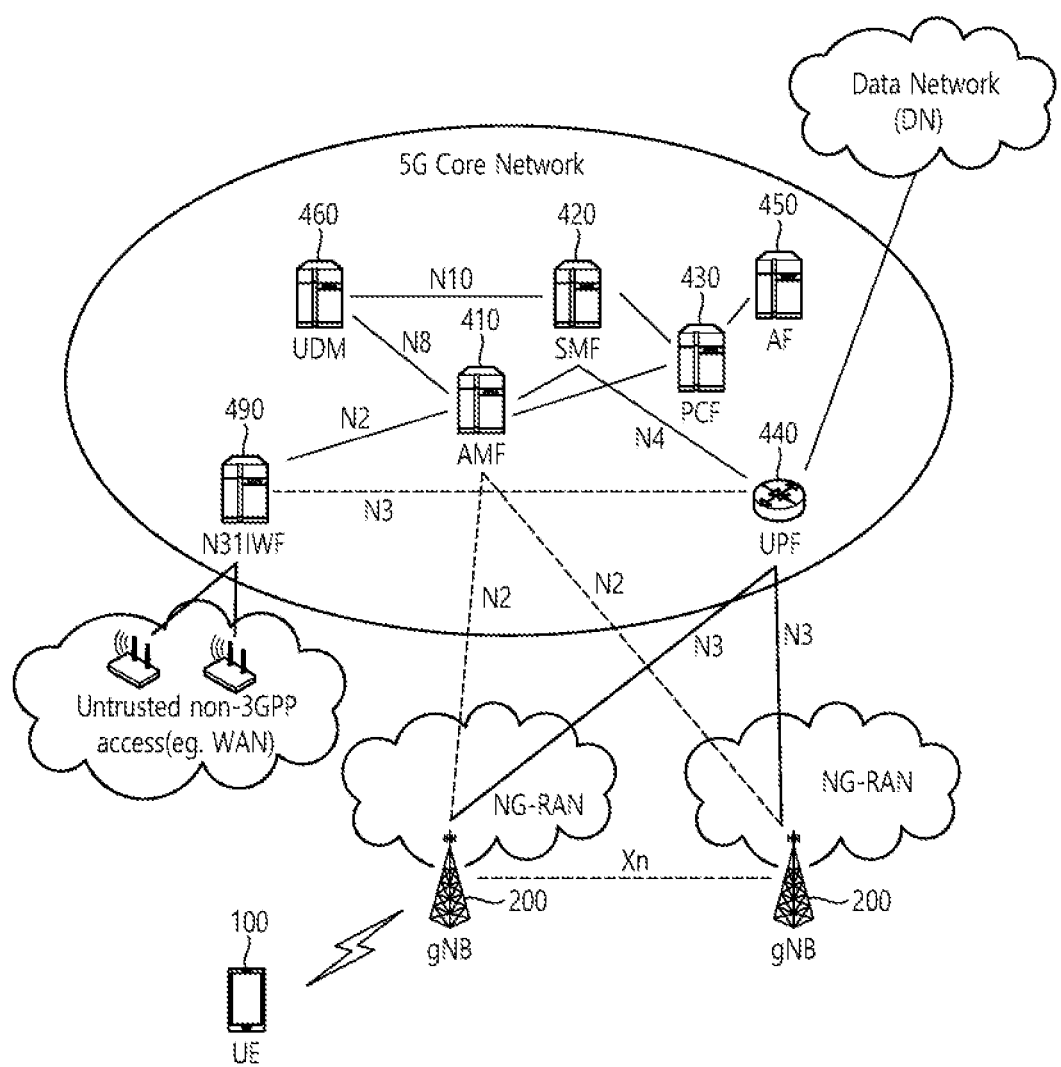
FIG. 5 is a structural diagram of a next-generation mobile communication network.

FIG. 5 is a structural diagram of a next-generation mobile communication network.

5GC (5G Core) may include various components, and in FIG. 1, AMF (Access and Mobility Management Function) 410, SMF (Session Management Function) 420, and PCF (Policy Control) corresponding to some of them Function) 430, UPF (User Plane Function) 440, AF (Application Function) 450, UDM (Unified Data Management) 460, and N3IWF (Non-3GPP InterWorking Function) 490.

The UE 100 is connected to a data network via the UPF 440 through a Next Generation Radio Access Network (NG-RAN) including the gNB 20.

The UE 100 may receive a data service through untrusted non-3rd Generation Partnership Project (non-3GPP) access, for example, a wireless local area network (WLAN). To connect the non-3GPP access to the core network, an N3IWF 490 may be deployed.

The illustrated N3IWF 490 performs a function of managing interworking between non-3GPP access and 5G systems. When the UE 100 is connected to non-3GPP access (e.g., WiFi referred to as IEEE 801.11), the UE 100 may be connected to the 5G system through the N3IWF 490. The N3IWF 490 performs control signaling with the AMF 410 and is connected to the UPF 440 through the N3 interface for data transmission.

The illustrated AMF 410 may manage access and mobility in a 5G system. The AMF 410 may perform a function of managing Non-Access Stratum (NAS) security. The AMF 410 may perform a function of handling mobility in an idle state.

The illustrated UPF 440 is a type of gateway through which user data is transmitted and received. The UPF node 440 may perform all or part of the user plane functions of a Serving Gateway (S-GW) and a Packet Data Network Gateway (P-GW) of 4G mobile communication.

The UPF 440 is an element that operates as a boundary point between the next generation RAN (NG-RAN) and the core network, and maintains a data path between the gNB 20 and the SMF 420. Also, when the UE 100 moves over an area served by the gNB 20, the UPF 440 serves as a mobility anchor point. The UPF 440 may perform a function of handling PDUs. For mobility within NG-RAN (Next Generation-Radio Access Network defined after 3GPP Release-15), UPF packets can be routed. In addition, the UPF 440 is another 3GPP network (RAN defined before 3GPP Release-15, for example, UTRAN, E-UTRAN (Evolved-Universal Mobile Telecommunications System (UMTS) Terrestrial Radio Access Network)) or GERAN (GSM (GSM)). It may function as an anchor point for mobility with Global System for Mobile Communication/EDGE (Enhanced Data rates for Global Evolution) Radio Access Network). UPF 440 may correspond to a termination point of a data interface towards a data network.

The illustrated PCF 430 is a node that controls the operator's policy.

The illustrated AF 450 is a server for providing various services to the UE 100.

The illustrated UDM 460 is a kind of server that manages subscriber information, like a home subscriber server (HSS) of 4G mobile communication. The UDM 460 stores and manages the subscriber information in a Unified Data Repository (UDR).

The illustrated SMF 420 may perform a function of allocating an Internet Protocol (IP) address of the UE. In addition, the SMF 420 may control a protocol data unit (PDU) session.

For reference, in the following AMF (410), SMF (420), PCF (430), UPF (440), AF (450), UDM (460), N3IWF (490), gNB (20), or UE (100) Reference numerals for may be omitted.

5G mobile communication supports multiple numerology or subcarrier spacing (SCS) to support various 5G services. For example, when SCS is 15 kHz, it supports a wide area in traditional cellular bands, and when SCS is 30 kHz/60 kHz, dense-urban, lower latency and wider carrier bandwidth, and when SCS is 60 kHz or higher, a bandwidth greater than 24.25 GHz to overcome phase noise.

Figure 6:
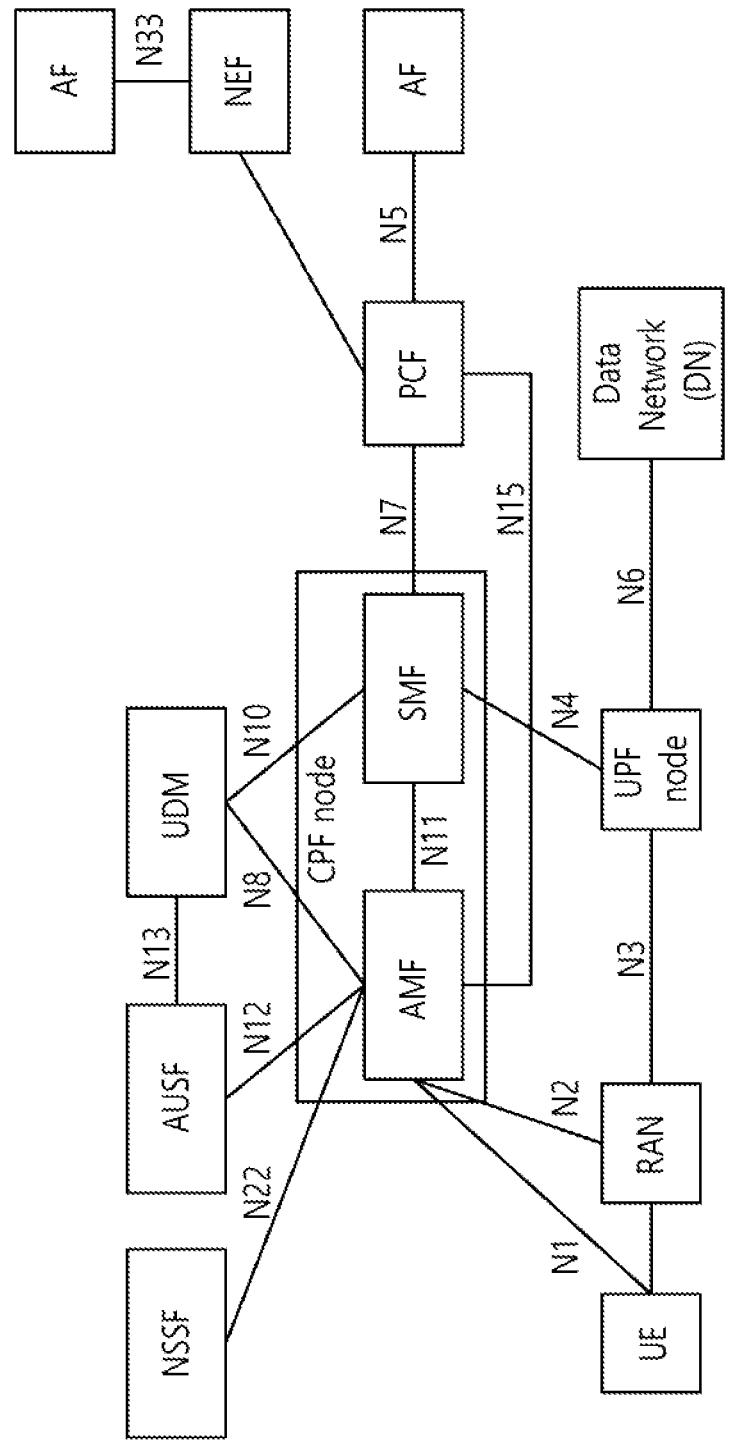
FIG. 6 is an exemplary diagram illustrating an expected structure of next-generation mobile communication from the viewpoint of a node.

FIG. 6 is an exemplary diagram illustrating an expected structure of next-generation mobile communication from the viewpoint of a node.

As can be seen with reference to FIG. 6, the UE is connected to a data network (DN) through a next-generation RAN (Radio Access Network).

The illustrated control plane function (CPF) node carries out all or part of the functions of the MME (Mobility Management Entity) of the 4th generation mobile communication, and out all or part of the control plane functions of a Serving Gateway (S-GW) and a PDN Gateway (P-GW). The CPF node includes an Access and Mobility Management Function (AMF) and a Session Management Function (SMF).

The illustrated User Plane Function (UPF) node is a type of gateway through which user data is transmitted and received. The UPF node may perform all or part of the user plane functions of the S-GW and P-GW of 4G mobile communication.

The illustrated PCF (Policy Control Function) is a node that controls the operator's policy.

The illustrated application function (Application Function: AF) is a server for providing various services to the UE.

The illustrated unified data management (UDM) is a kind of server that manages subscriber information, like a home subscriber server (HSS) of 4G mobile communication. The UDM stores and manages the subscriber information in a Unified Data Repository (UDR).

The illustrated Authentication Server Function (AUSF) authenticates and manages the UE.

The illustrated network slice selection function (NSSF) is a node for network slicing as will be described later.

The illustrated Network Exposure Function (NEF) is a node for providing a mechanism for securely exposing the services and functions of the 5G core. For example, NEF may expose functions and events, may securely provide information from external applications to the 3GPP network, may translate internal/external information, may provide control plane parameters, and may manage packet flow description (PFD).

<Edge Computing>

Edge computing is a one of distributed computing paradigm that introduces computation and data storage where needed to improve response times and conserve bandwidth.

The growth of IoT devices on the edge of the network is creating computationally significant amounts of data and passing it to data centers, pushing network bandwidth requirements to the limit. Despite improvements in network technology, data centers cannot guarantee acceptable transfer rates and response times, which are critical requirements for many applications. Furthermore, edge devices continue to consume data from the cloud, forcing enterprises to decentralize data and service provisioning by creating content delivery networks. As such, the purpose of edge computing is to move computation away from the data center to the edge of the network, perform tasks using smart objects, mobile phones, and network gateways, and provide services via the cloud. By moving services to the edge, content cache, service delivery, storage and IoT management may be provided, thereby needed response times and transfer speeds are enabled.

1. Search Edge Application Server

In edge computing deployment, one application service may be provided by several edge application servers deployed in different sites in general. These multiple edge application server instances hosting the same content or service may use a single IP address (any cast address) or different IP addresses. In order for traffic to be routed locally to the edge application server via the UL CL/BP mechanism, it is very important for the application/UE to discover the IP address of one suitable edge application server (e.g., nearest server) before the application/UE starts to connect to the service. It can optimize service latency, traffic routing path and user service experience. Also, if the found edge application server is not optimized (e.g., after the UE has moved away), a new edge application server may be used to replace the old server to serve the application/UE.

Edge application server reselection may be triggered by 5GS or application layer events. For example, in the first case, it may be triggered by a user plane change initiated by the network, such as a mobility event (e.g., handover) or a failure event that is ultimately 5GS referenced. In the second case, the edge application server may become congested or unavailable, it may be started up. This requirement depends on whether the application can tolerate changes to the application server instance.

Accordingly, in order for the UE to receive the edge computing service well, a method for supporting EAS (Edge Application Server) search is required.

2. Solution 1: Provide URSP (UE Route Selection Policy) Configuration to the UE to Establish a PDU Session for the Edge Application This solution solves the problem related to the EAS search described above. This solution may include aspects related to:

What information (if any) can be used to assist such a discovery mechanism?

In the current study architecture assumption, the UE may need to establish connectivity with specific characteristics, e.g. to a specific slice or to a dedicated DN or in SSC mode 2/3, in order to perform any further action, e.g. discovery of Edge Application Servers (EAS).

This solution proposes to provision URSP rules to the UE to establish the appropriate PDU Session before performing Edge AS discovery. The Edge AS discovery is not covered in this solution. The solution assumes a locally distributed UPF with IP anchor is used to access the Edge services. The solution can be used for connectivity model "multiple PDU sessions"

(1) Description

In order to enable the communication to perform Edge AS discovery and further communication with the selected EAS via the appropriate PDU Session, the 5GC may provision policy configuration consisting of URSP rules, which could be locally configured on the UE or provisioned by UE Configuration Update Procedure.

At Registration (initial or mobility), the UE may include the UE Policy Container in order to receive the URSP rules from the 5GC.

Additionally, in order to update the URSP rules due to UE mobility, the Application Function (AF) may subscribe to UE location information from the 5GC.

The solution relies on the UE Configuration Update Procedure to provision the URSP rules to the UE thus the same limitations apply. This means that in roaming scenario the H-PCF is in control to update the policy to the UE, and the AF must belong to or have an agreement with HPLMN.

(2) Procedure

Figure 7:
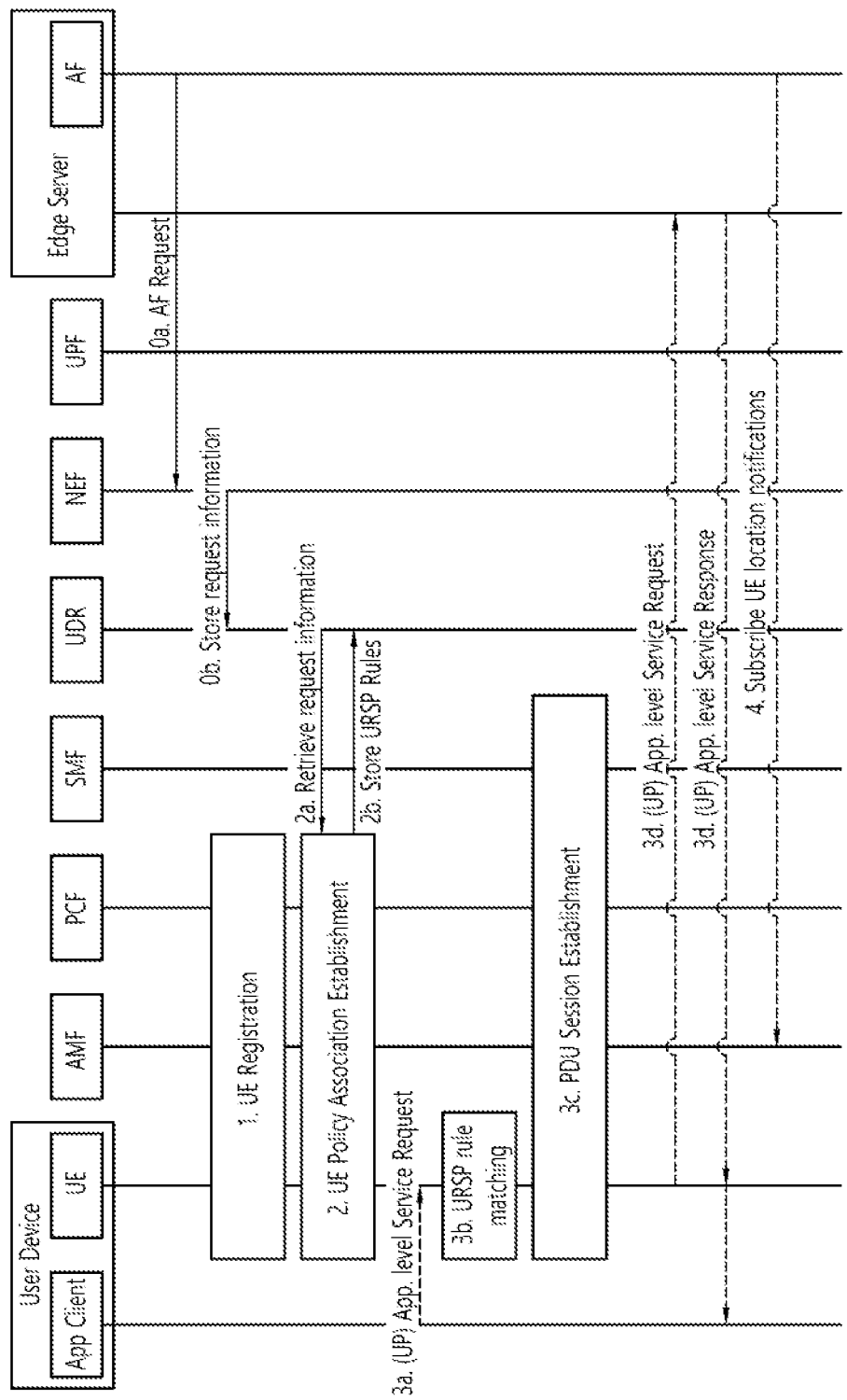
FIG. 7 illustrates a procedure for providing a URSP configuration to a UE for purposes related to performing EAS discovery and further communication with a selected EAS.

FIG. 7 illustrates a procedure for providing a URSP configuration to a UE for purposes related to performing EAS discovery and further communication with a selected EAS.

0a. The application layer, acting as AF, uses the Nnef_ServiceParameter service to provide URSP influence parameters for the edge n traffic (identified by IP address of the EAS or FQDN of the Edge service) to the NEF. The AF may also indicate Spatial Validity Condition defining a geographical zone identifier(s) where the policy requirements are applicable.

Note: The AF is not able to influence to the Location Criteria in the URSP when the UE is roaming.

The AF sends the request to the NEF. The AF indicates whether the URSP influence parameters apply to an individual UE, group of UEs or any UE.

1. When the UE Performs (Initial or Mobility) Registration to 5GC, the UE May Include the UE Policy Container in the Registration Request 2. UE Policy Association Establishment The PCF determines the URSP rules based on the URSP influence parameters as requested by the AF in step 0. The URSP rules includes DNN, S-NSSAI and other relevant network parameters to be used for matching Edge application traffic, e.g. traffic from Edge Application clients installed on the UE to Edge Application Servers. If the AF provided Spatial Validity Conditions in Step 0, the PCF generates Location Criteria based on the Spatial Validity Conditions, and includes corresponding Location Criteria in the RSD part in the URSP rules. The PCF can use a dedicated Policy Section for the URSP rules that are specific for a particular Edge DN. In step 2b, the PCF stores the URSP rules to the UDR as part of UE's Policy Set entry. The PCF uses the UE Configuration Update Procedure to provide URSP rules to the UE. In alternative to steps 0-2, the operator may configure the URSP locally in the UE.

3. When the UE needs to send traffic destined to an edge service the UE triggers the Edge AS discovery by sending a DNS query for an FQDN of the edge service. The details for this step are out of scope of this solution. After this, the Application Client sends an application layer service request to an IP address of the EAS in the Edge Hosting Environment.

If the FQDN in the DNS Query, or the EAS IP address in the application layer service request matches with the destination address in the Traffic descriptor part of the URSP rule as provisioned in Step 1, the UE, based on URSP rule matching (step 3b), establishes a new PDU session (step 3c) in order to enable User Plane communication (step 3d) with the DN where the DNS Server or the Edge Application Server resides. It is assumed that the DNS address configuration provided during the PDU session establishment can be used to send the DNS Query.

Note: Based on the Location Criteria in the URSP rule the same FQDN in the DNS Query may trigger establishment of PDU Session to either a local Data Network or to a remote/central Data Network. In both cases, the authoritative DNS nameserver that holds the DNS record for the FQDN is the same.

4a. (optional) the AF may subscribe to UE location notifications; the notifications may be used by the AF to trigger AF request as in Step 0 to update the URSP influence parameters to edge applications for the UE.

4b. (optional) if multiple location specific URSP rules are used in Step 0, i.e. the Location Criteria in the RSD part is configured so that different rules applies per UE location. the UE may need to re-evaluate the application association with a PDU session e.g. when the UE location does not match anymore with the Location Criteria. If the re-evaluation leads to a change of the application to PDU Session association, the UE may enforce such changes in a timely manner based on implementation, e.g. immediately or when UE enters CM-IDLE state.

(3) Impacts on Services, Entities and Interfaces

The proposed solution is based on Rel-16 procedures but some enhancements may be needed to make it possible for the AF to configure the edge service FQDNs on session basis to the URSP rules, such as:

Enhance the NEF service Nnef_ServiceParameter to allow the AF to influence PCF decisions for URSP rules for one UE, group of UEs, or any UE. The AF can use the service to provide parameters without the need to have the UE registered in the network. These parameters are stored in the UDR and then provided to the PCF serving the AMF, when UE registers in the AMF. The PCF determines the URSP rules based on the URSP influence parameters and stores the URSP rules to the UDR as part of UE's Policy Set entry. The PCF can assign a Policy Section Identifier that is specific to the Edge DN when the PCF stores the URSP rules to the UDR. The new parameters of the Nnef_ServiceParameter service include the FQDN or list of IP addresses of the EAS in the AF Request.

Include the Spatial Validity Condition in the AF Request.

PCF needs to be able to retrieve and get notified for the URSP influence parameters for the Edge services from the UDR.

II. Problems to be Solved in the Disclosure of this Specification

In an edge computing environment, one application is usually served by multiple EASs deployed at different sites. In order for the application of the UE to initiate a service, it is necessary to search for an IP address of an appropriate EAS among the plurality of EASs and communicate with the corresponding EAS. An example of a suitable EAS may be the nearest EAS. This is because it is important to reduce service latency by routing edge application traffic locally. In the standard, the Application Function (AF) provides EAS information (e.g., EAS IP address, EAS FQDN, Location Criteria, etc.) to the PCF through UDR, and the PCF configures the URSP rule based on this and the PCF provides it to the UE. Then, Edge application mapped to EAS information can communication with EAS. That is, it let the UE determine a PDU Session that can provide a connection to the EAS that the Edge Application Client will communicate with.

The above process may be problem when the UE roams.

URSP can only be provided by HPLMN (i.e., H-PCF). If the UE has roamed, the UE will communicate with the EAS deployed close to the VPLMN. Since H-PCF must obtain EAS information, AF must provide EAS information directly to HPLMN. For example, for an application that provides edge computing services in VPLMN #1, to serve even UEs inbound roaming to VPLMN #1, the AF will send each EAS information to the HPLMNs of the UEs (which can be multiple PLMNs). Inefficiency may arise in having to provide each one directly.

III. Disclosure of the Present Specification

The disclosures described below in this specification may be implemented in one or more combinations (e.g., a combination including at least one of the contents described below). Each of the drawings shows an embodiment of each disclosure, but the embodiments of the drawings may be implemented in combination with each other.

The description of the method proposed in the disclosure of the present specification may consist of a combination of one or more operations/configurations/steps described below. The following methods described below may be performed or used in combination or complementarily.

The proposed method to support edge application server discovery may consist of a combination of one or more of the following operations/configurations/steps.

In the present specification, edge computing, mobile edge computing, edge service, edge application, and the like may be used interchangeably.

In the present specification, AF request, AF request information, AF data, service specific parameters/information provided by AF, application data provided by AF, and AF are provided Service data, service parameters provided by AF, edge service specific parameters/information provided by AF, etc. may be used interchangeably.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 8:
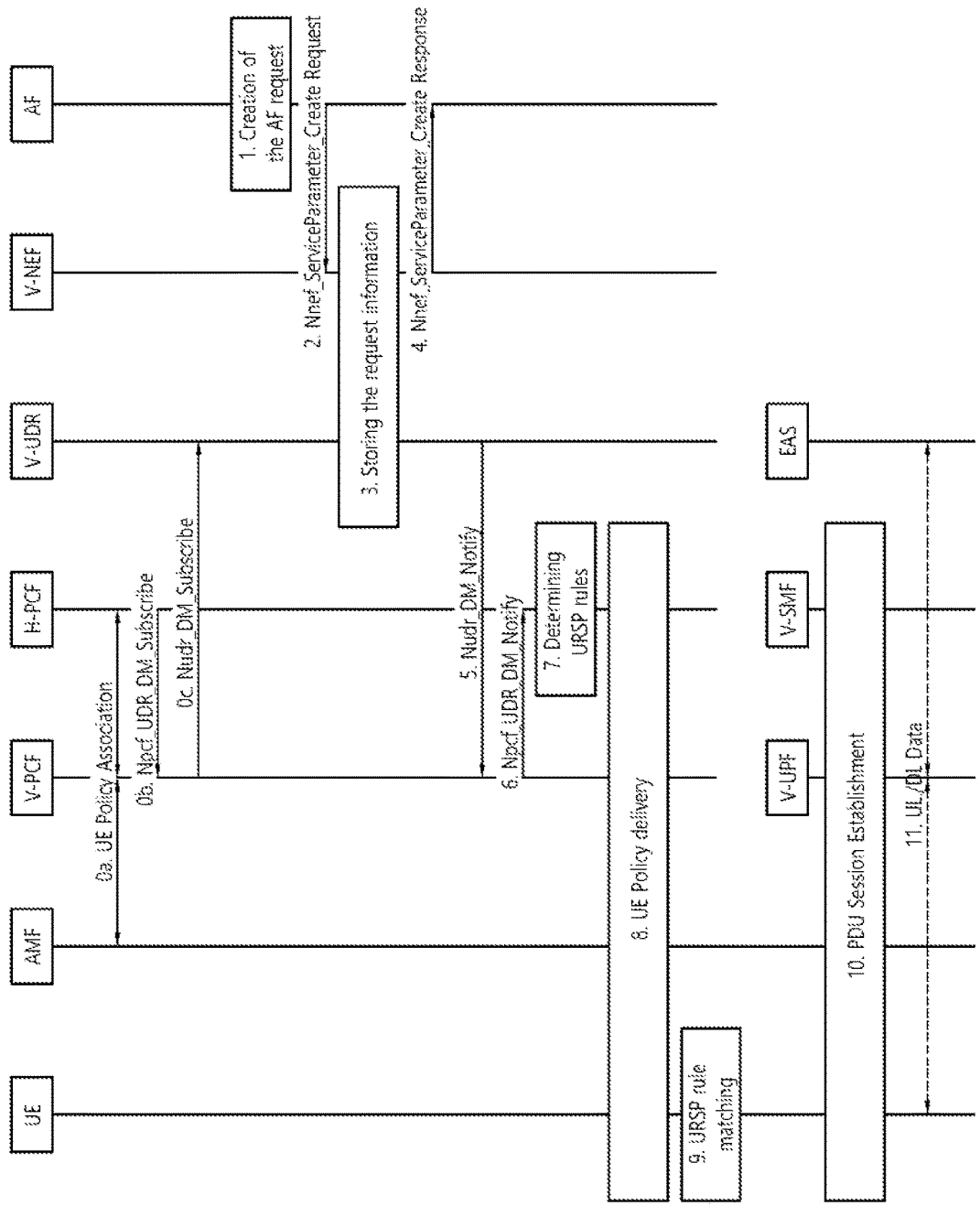
FIG. 8 shows an embodiment according to the disclosure of the present specification.

FIG. 8 shows an embodiment according to the disclosure of the present specification.

FIG. 8 shows a procedure for provisioning a URSP rule including Edge Application Server (EAS) information to a roaming UE with a local breakout.

URSP rules including EAS information may be interpreted as URSP rules including information related to edge computing.

Edge computing may enable operator and 3rd party services to be hosted close to the UE's access point of attachment, so as to achieve an efficient service delivery through the reduced end-to-end latency and load on the transport network. Therefore, it may be considered appropriate that UE's serving network for roaming scenario obtains the edge computing related information from the AF that locally locates and provides it to the UE.

0. The UE may be registered to 5GC and the UE Policy Association may be performed between the AMF and the H-PCF via V-PCF (step 0a).

In this figure, PCF is UE Policy PCF. That is, it is a PCF that provides policies such as UE Route Selection Policy (URSP) and Access Network Discovery & Selection Policy (ANDSP) to the UE.

The H-PCF may request V-PCF to perform the subscription to notification to the data modified in the V-UDR for the UE (step 0b). For this operation, new service operation, Npcf_UDR_DM_Subscribe can be defined.

The Npcf_UDR_DM_Subscribe message may include an identifier (e.g., SUPI) of the UE and information indicating service subscription for service specific information for the UE.

Based on the request from the H-PCF, the V-PCF may subscribe to notification to the data modified in the V-UDR by invoking Nudr_DM_Subscribe (AF service parameter provisioning information, SUPI, Data Set setting to "Application Data", Data Subset setting to "Service specific information") (step 0c).

In edge computing, EAS information is provided by AF to UDR. In case of roaming, AF may provide EAS information to V-UDR. URSP rules may be determined based on such EAS information. At this time, since the V-PCF has subscribed to the V-UDR for data modification notification service, when the EAS information provided by the AF is updated or modified, the V-PCF can recognize it.

Conventionally, AF delivers EAS information directly to each PLMN for roamed UEs, but according to the disclosure of the present specification, AF provides EAS information only to the V-UDR of the VPLMN. EAS information can be provided to PCF of each HPLMN via V-PCF.

Although the response message for step 0b and step 0c is not shown, the V-PCF may send a response message for step 0b to the H-PCF, and the V-UDR may send a response message for step 0c to the V-PCF. The response message for step 0b may be transmitted after receiving the response message for step 0c. This may apply throughout this specification.

1. To provide EAS information, the AF may create a new request. The content of the AF request may include the following information.

1) Service Description

For identifying the service, the service description in the AF request may be represented by the combination of DNN and S-NSSAI, an AF-Service-Identifier or an application identifier.

In addition to the above, various information may be used to identify or indicate a service (e.g., service identifier, application identifier, FQDN information related to service/application/Domain/EAS).

2) Service Parameters

A list of EAS information may be included as Service Parameters in order to support the service identified by the Service Description. Each EAS information may include the following parameters:

EAS address information: IP address of EAS or FQDN of Edge service (this may be interpreted as FQDN of EAS).

The IP address of the EAS may be an IPv4 address and/or IPv6 prefix information. In addition, it may include a transport port # (i.e., transport layer port #).

When the FQDN of Edge service is included as EAS address information, the UE may have to perform a DNS query for the FQDN of the Edge service to resolve EAS IP address information from the FQDN of Edge service provided as EAS Selection information to the URSP.

When AF includes FQDN of Edge service as EAS address information, local DNS server IP address information may also be included. In this case, the PCF may also include the local DNS server IP address information in the URSP as part of the domain descriptors information or as the form of new information that maps to it (in this case as part of a traffic descriptor or as part of route selection components or as a new component/IE). As such, when the local DNS server IP address information is provided, the UE may transmit the DNS query for the FQDN of the Edge service using the local DNS service IP address.

A plurality of the EAS address information may be included. In this case, there is a plurality of EAS address information mapped to one Service Description. Also, the EAS address information may be mapping information of FQDN information related to service/application/Domain/EAS and an IP address of EAS. For example, if chatting and voice call are possible with a certain messenger application, the plurality of EAS address information may be configured with FQDN information related to chatting of the application, mapping information of EAS IP address for this, FQDN information related to voice call of the application and mapping information of IP address of EAS for this. Alternatively, the EAS address information may be service/application/EAS related transport layer port # information and mapping information of an IP address of the EAS. Alternatively, the EAS address information may be service/application/Domain/EAS related FQDN information, transport layer port # information or mapping information between IP addresses of EAS. In the above, FQDN information and/or transport layer port # information was described as a method of distinguishing different types/characteristics of services/traffic (e.g., chatting service and voice call service in Messenger Application) in one Service Description. In addition, other information (e.g., service type information, Sub Application ID information, etc.) may be used.

As such, when a plurality of EAS address information is included, the PCF configures the URSP based on the included information.

When a plurality of EAS Address Information is included for one Traffic Descriptor (e.g., one application) in URSP, the UE may communicate using EAS IP addresses that are matched/mapped for each traffic/service. For example, when chatting and voice call are possible with Messenger Application, it may communicate with the EAS IP address mapped here for chatting service and communicate with the EAS IP address mapped to this for voice call service.

(Optional) Location Criteria where the EAS address information is applicable.
(Optional) Time Window where the EAS address information is applicable.

Location Criteria that can be included in the AF request may be interpreted as Location Information, Location Restriction, Validity Location, Valid Location, etc. When Location Criteria is included in the AF request, it means that the UE can communicate with the EAS mapped only in the corresponding location/region. In addition, the Time Window that can be included in the AF request may be interpreted as Time Information, Time Restriction, Time Criteria, Validity Time, Valid Time, etc. When the Time Window is included in the AF request, it means that the UE communicates with the EAS mapped only at that time. When both the Location Criteria and the Time Window are included in the AF request, it means that the UE can communicate with the EAS mapped only at the corresponding time in the corresponding location/region. This may apply throughout this specification.

3) Target UE(s).

Target UE(s) of Service Parameters is individual UE(s), group(s) of UEs, or any UE.

Conventionally, the AF needs to transmit information including the above information one by one to each HPLMN of a plurality of connected UEs. However, according to the disclosure of the present specification, the V-PCF may transmit to the H-PCF. Therefore, the AF only needs to transmit the above information to the V-NEF (i.e., only one PLMN corresponding to the VPLMN) as in step 2.

2. The AF may send its request to the V-NEF. The V-NEF may authorize the AF request and may assign a Transaction Reference ID to the Nnef_ServiceParameter Create request.

If needed, the V-NEF may perform the following mappings:

Map the AF-Service-Identifier into DNN and S-NSSAI combination, determined by local configuration.
Map the GPSI in Target UE Identifier into SUPI.
Map the External Group Identifier in Target UE Identifier into Internal Group Identifier.

3. The V-NEF may store the AF request information in the V-UDR as the "Application Data" (Data Subset setting to "Service specific information") together with the assigned Transaction Reference ID.

The V-NEF may be stored by setting a newly defined value (e.g., "Edge Service specific information") instead of "Service specific information" when storing the AF request in the V-UDR. In this case, when subscribing to a notification service for related information with V-UDR, a value newly defined as required data must be set.

4. The V-NEF may respond to the AF. The response message may include the assigned Transaction Reference ID.

5. The V-PCF may receive a Nudr_DM_Notify notification of data change from the V-UDR. According to the subscription in step 0c, when updates, changes, etc. in EAS information occur, the V-UDR may notify the V-PCF about it. These notifications may include updated EAS information.

6. The V-PCF may send the notification of data change from the V-UDR to the H-PCF by invoking Npcf_UDR_DM_Notify. New service operation, Npcf_UDR_DM_Notify can be defined. According to the subscription in step 0b, updates, changes, etc. in EAS information occur, the V-PCF may notify it to the H-PCF. These notifications may include updated EAS information. Therefore, the H-PCF may recognize the EAS information updated by the notification.

7. The H-PCF may determine the URSP rules based on the data including EAS information.

The PCF may use the Service Description and Service Parameters in the AF request information to set the Traffic descriptor, Route selection components and Route Selection Validation Criteria in the URSP rules. The EAS address information included in the Service Parameters may be used to set the Domain descriptors in the Traffic descriptor part.

If the Location Criteria provided by the AF is a form of location information not used by the URSP rules, e.g. geo coordinates, the PCF may apply parameter mapping from the Location Criteria provided by the AF to the location information used by the URSP rules, e.g. cell ID list, TAI list.

For example, the URSP rules can include DNN, S-NSSAI and other relevant network parameters to be used for matching Edge application traffic. In addition, the URSP rules may include the EAS IP address for routing of Edge application traffic in the EAS Selection in the Route Selection Descriptor (RSD) part. If the AF provided Location Criteria in step 2, the H-PCF may include corresponding Location Criteria in the Route Selection Descriptor (RSD) part in the URSP rules. If the AF provided Time Window in step 2, the H-PCF may include corresponding Time Window in the RSD part in the URSP rules.

Determining the URSP rules by the H-PCF may be interpreted as setting URSP rules or configuring URSP rules or creating/updating/deleting URSP rules.

8. The H-PCF may provision the URSP rules to the UE via the V-PCF by using the UE Configuration Update procedure for transparent UE Policy delivery. The H-PCF may provide the URSP rules to the V-PCF by invoking Npcf_UEPolicy-Control UpdateNotify Request.

9. The UE needs to send traffic destined to an Edge service. Therefore, the UE may determine a URSP rule applicable for the Edge application.

10. If there is no PDU Session that matches all components in the selected RSD within the URSP rule, the UE may establish a PDU Session.

Otherwise, this step may be skipped and a matching PDU Session may be associated with the Edge application.

11. The UE may communicate with the EAS by using the EAS IP address.

If the EAS IP address needs to be resolved from the FQDN of the Edge service, the UE may perform the EAS discovery by sending a DNS query for the FQDN of the Edge service.

The AF that sends the AF request including EAS information and the EAS that the traffic is routed to/from the UE can be same or different.

The AF may update service specific parameters in the UDR via the NEF or delete service specific parameters from the UDR via the NEF. When EAS(s) are added or removed, the PCF may modify the URSP based on the EAS information updated or deleted by the AF and provide the modified URSP to the targeted UE. The UE may apply the modified URSP.

After all, the URSP including the EAS information may allow the roaming UE to determine the PDU Session to be used for edge application/service/traffic, and when it is necessary to establish the PDU Session, it may indicate how to create the PDU Session.

In step 0b, the H-PCF may subscribe to notifications related to data update or modification that occur in V-UDR through V-PCF, and at the same time, may also subscribe to notifications related to update or modification with H-UDR. Accordingly, upon receiving notification related to an update or modification from the H-UDR, the H-PCF may determine a URSP based the notification and provide the URSP to the UE. In particular, when a conflict or overlap occurs between the AF request including the EAS information received from the H-UDR and the AF request including the EAS information received from the V-UDR, the H-PCF may reflect this to the URSP with an integrated form, also reflect this to the URSP by prioritizing them.

The H-PCF may subscribe to notifications related to updates or modifications occurring in the V-UDR through the V-PCF in step 0b. However, unlike this, the H-PCF subscribes to the update or modification related notification to the UE with the V-PCF, and the V-PCF subscribes to the V-UDR for the update or modification related notification, thereby the H-PCF can be provided the update or modification related notification. Alternatively, even if the H-PCF does not subscribe to the notification service, when the V-PCF receives notification related to an update or modification from the V-UDR, V-PCF may provide it to the H-PCF.

The names of service operations newly defined in step 0b, step 0c, step 2, and step 3 may be defined as different names. In addition, in these steps (in some or all), the existing service operation may be extended and used.

In the above, the AF may provide EAS information to the NEF/UDR by using service specific parameter provisioning. Alternatively, the AF may provide EAS information to NEF/UDR using Application Function influence on traffic routing.

Although the above embodiment describes roaming in the local breakout method, this may also be applied to roaming in the home routed method.

The above embodiment may be applied to "Distributed Anchor Point" and "Multiple PDU sessions" connectivity model.

Figure 9:
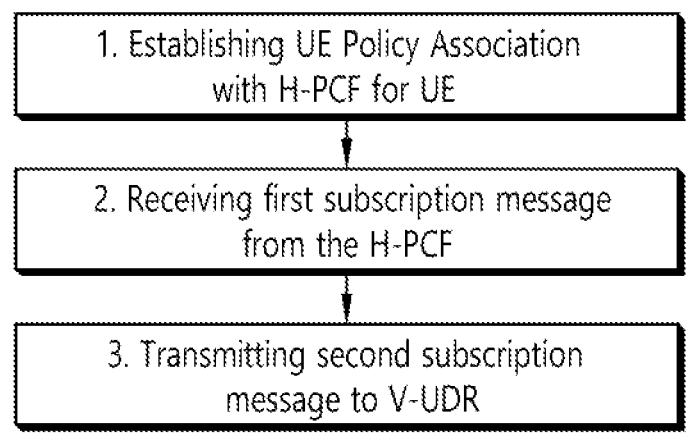
FIG. 9 shows a procedure of V-PCF according to the disclosure of the present specification.

FIG. 9 shows a procedure of V-PCF according to the disclosure of the present specification.

1. V-PCF may establish UE Policy Association with an H-PCF (Home Public Land Mobile Network-Policy Control Function) for UE.

2. V-PCF may receive a first subscription message from the H-PCF. The first subscription message may be request for notification based EAS (edge application server) information being updated or modified.

In addition, the subscription message may be a message that causes the V-PCF to perform step 3, which will be described later.

3. V-PCF may transmit a second subscription message to a V-UDR (Visited Public Land Mobile Network-Unified Data Repository). The second subscription message is request for notification based the EAS information being updated or modified.

If the EAS information is updated or modified, the V-UDR may notify the V-PCF, and the V-PCF may notify the subscribed H-PCF. The aforementioned notification may be performed through a notification message.

The notification message may include updated EAS information.

Figure 10:
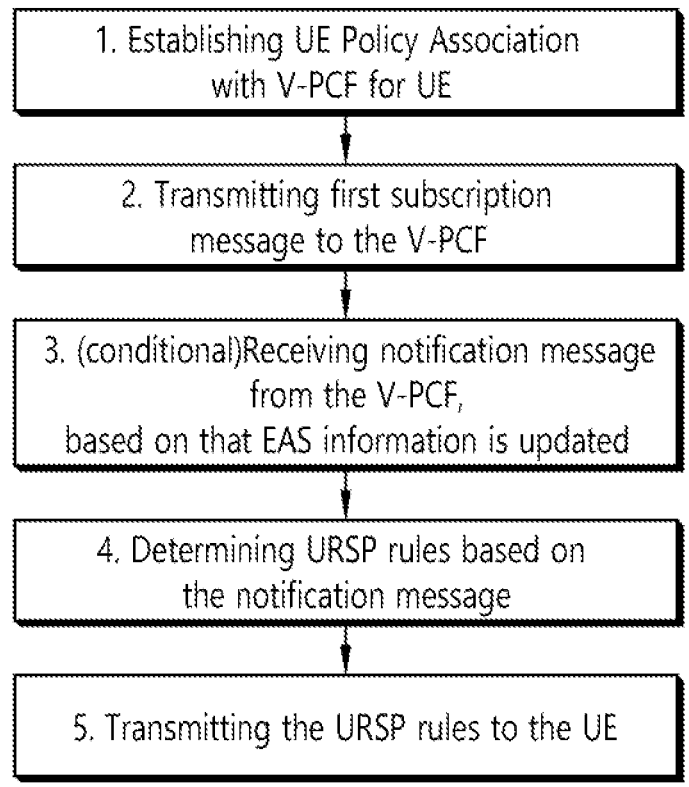
FIG. 10 shows a procedure of H-PCF according to the disclosure of the present specification.

FIG. 10 shows a procedure of H-PCF according to the disclosure of the present specification.

1. H-PCF may establish UE Policy Association with a V-PCF (Visited Public Land Mobile Network-Policy Control Function) for the roaming UE.

2. H-PCF may transmit a first subscription message to the V-PCF. The first subscription message may be request for notification based EAS (edge application server) information being updated or modified.

The first subscription message may make the V-PCF transmit a second subscription message to V-UDR (Visited Public Land Mobile Network-Unified Data Repository).

3. If the EAS information is updated or modified, the V-UDR may notify the V-PCF, and the V-PCF may notify the subscribed H-PCF. The aforementioned notification may be performed through a notification message.

The notification message may include updated EAS information. Accordingly, the H-PCF may recognize the updated EAS information.

4. H-PCF may recognize that the EAS information is updated or modified. Then H-PCF may determine URSP (UE Route Selection Policy) rules, based on the notification message.

5. H-PCF may transmit the URSP rules to a UE (user equipment) via the V-PCF.

According to this process, the terminal receives the URSP rules and connects to the edge application server to perform edge computing.

The present specification may have various effects.

For example, through the disclosures in the present specification, the V-PCF can efficiently perform edge computing by delivering updated EAS information to each the H-PCF of the UEs roaming to the PLMN to which the V-PCF belongs.

The claims described in the present specification may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim may be combined to be implemented as an apparatus, and the technical features of the method claim of the present specification and the technical features of the apparatus claim may be combined and implemented as a method. Other implementations are within the scope of the following claims.

What is claimed is:

1. A method for performing communication with Edge computing, performed by a V-PCF (Visited Public Land Mobile Network-Policy Control Function), comprising:

establishing UE Policy Association with an H-PCF (Home Public Land Mobile Network-Policy Control Function);

receiving a first subscription message from the H-PCF; and transmitting a second subscription message to a V-UDR (Visited Public Land Mobile Network-Unified Data Repository), wherein the first subscription message is request for notification based EAS (edge application server) information being updated or modified, wherein the second subscription message is request for notification based the EAS information being updated or modified, wherein the second subscription message is based on the first subscription message, wherein the EAS information created by AF (Application Function) is transmitted to the V-UDR.

2. The method of claim 1, wherein the EAS information includes IP address of EAS and FQDN (Fully Qualified Domain Name) of the EAS.

3. The method of claim 1, wherein the EAS information is related to service identified by one among i) combination of DNN (Data Network Name) and S-NSSAI (Single Network Slice Selection Assistance Information), ii) AF-Service-Identifier and iii) application identifier.

4. The method of claim 1, wherein the EAS information is related to individual UE(s), group(s) of UEs or any UE.

5. The method of claim 1, further comprising:

receiving, from the V-UDR, a notification message indicating that the EAS information was updated or modified;

transmitting the notification message to the H-PCF.

6. A method for performing communication with Edge computing, performed by an H-PCF (Home Public Land Mobile Network-Policy Control Function), comprising:

establishing UE Policy Association with a V-PCF (Visited Public Land Mobile Network-Policy Control Function);

transmitting a first subscription message to the V-PCF, wherein the first subscription message is request for notification based EAS (edge application server) information being updated or modified, wherein the first subscription message makes the V-PCF transmit a second subscription message to V-UDR (Visited Public Land Mobile Network-Unified Data Repository), wherein the second subscription message is request for notification based the EAS information being updated or modified, wherein the EAS information created by AF (Application Function) is transmitted to the V-UDR;

receiving, from the V-PCF, a notification message indicating that the EAS information was updated or modified;

determining URSP (UE Route Selection Policy) rules, based on the notification message;

transmitting the URSP rules to a UE (user equipment) via the V-PCF.

7. The method of claim 6, wherein the EAS information includes IP address of EAS and FQDN (Fully Qualified Domain Name) of the EAS.

8. The method of claim 6, wherein the EAS information is related to service identified by one among i) combination of DNN (Data Network Name) and S-NSSAI (Single Network Slice Selection Assistance Information), ii) AF-Service-Identifier and iii) application identifier.

9. The method of claim 6, wherein the EAS information is related to individual UE(s), group(s) of UEs or any UE.

* * * * *